(12) United States Patent
Price

(10) Patent No.: US 6,394,744 B1
(45) Date of Patent: May 28, 2002

(54) STACKING MACHINE FOR PART TRAYS

(75) Inventor: William F. Price, Madison, WI (US)

(73) Assignee: Sparta Lift, L.L.C., Detroit, MI (US)

( * ) Notice: Subject to any disclaimer, the term of this patent is extended or adjusted under 35 U.S.C. 154(b) by 0 days.

(21) Appl. No.: 09/337,842

(22) Filed: Jun. 22, 1999

(51) Int. Cl.[7] .............................................. B65G 60/00
(52) U.S. Cl. .................... 414/810; 414/411; 414/788.7; 414/792.9
(58) Field of Search .......................... 414/788.4, 792.9, 414/933, 411, 811, 810

(56) References Cited

U.S. PATENT DOCUMENTS

| 3,863,777 | A | | 2/1975 | Murata | |
|---|---|---|---|---|---|
| 4,205,934 | A | * | 6/1980 | Pantin et al. | 414/933 X |
| 4,541,762 | A | * | 9/1985 | Tischler et al. | 414/788.7 |
| 4,557,656 | A | * | 12/1985 | Ovellette | 414/933 X |
| 4,687,403 | A | * | 8/1987 | Motoda | 414/788.4 |
| 4,741,657 | A | | 5/1988 | Cassel | 414/267 |
| 4,775,277 | A | | 10/1988 | Zeleny | |
| 4,969,791 | A | | 11/1990 | Stolzer | 414/281 |
| 4,983,095 | A | | 1/1991 | Chiappe et al. | |
| 5,147,176 | A | | 9/1992 | Stolzer et al. | |
| 5,498,122 | A | * | 3/1996 | Miura et al. | 414/788.7 X |

FOREIGN PATENT DOCUMENTS

| DE | 31 13 976 | * | 10/1982 | ............. 414/788.4 |
|---|---|---|---|---|
| JP | 1-115526 | * | 5/1989 | ............. 414/788.7 |

* cited by examiner

*Primary Examiner*—Janice L. Krizek
(74) *Attorney, Agent, or Firm*—Harness, Dickey & Pierce, P.L.C.

(57) ABSTRACT

An apparatus for presenting components stored in stackable trays, and removing empty trays having a base member having an input and an output portion; a discharge area; a shuttle member which removes empty storage trays and places them in the discharge area.

8 Claims, 12 Drawing Sheets

STACKING MACHINE FOR PART TRAYS

BACKGROUND AND SUMMARY OF THE INVENTION

The present invention relates to devices for controlling delivery of workpieces and/or workpiece containers of substantial size in manufacturing or assembly operations and, more particularly, to an improved material storage and delivery structure and system for storing, delivering, positioning and removing both full and empty workpiece containers to and from assembly or production line workstations as desired.

As is well known, assembly or production line facilities require the delivery and temporary storage of large volumes of production parts at or near assembly or production line workstations to support worker line operations on a continuous mass production basis. Automotive production line or assembly line operations in particular require the delivery of large numbers of parts of substantial size for assembly to automotive or truck vehicles or subsystems thereof, on a continuous basis. For example, engines, body panel parts, air conditioning assemblies, fuel tanks and brake assemblies are typically stored, moved and delivered to line workstations in stackable trays or pallets, which have a substantial volume and mass.

Due to the fact that mass production operations require the continuous delivery of a large number of such parts during any particular work shift, typical assembly line operations require movement, positioning and temporary storage of large numbers of such stackable trays at the production facility. Substantial floor space is thus often needed for movement and repositioning of both full and empty trays to facilitate delivery of full trays to the production line and removal of empty trays when the production parts contained in each tray has been fully depleted. Typically, empty trays are moved by the line operators into a position out of the way. Due to the size and weight of these empty trays, significant ergonomic problems have arisen.

It is, therefore, desirable to provide a production part container storage and delivery system which facilitates the delivery of fresh trays of parts to a production line work station as needed. It is also desirable to provide such a system, which enables empty trays to be similarly removed from assembly line workstations without operator or continuous service vehicle assistance. It is further desirable to provide such a system which stores in positions full and empty production part trays as desired and which facilitates the storage, delivery, positioning and removal of a sufficient number of such trays to obviate the need for supplemental vehicle intervention over the entire work shift. It is also desirable to provide a system which enables production workers to index the height of the trays at the workstation as needed to improve ergonomic conditions.

The present invention is intended to satisfy the above desirable features through the provision of a new and improved container storage and delivery structure and system which is designed in structural modules operative to define a base portion having an input and output portion, a shuttle lift for lifting and positioning empty trays into a discharge portion, and a shuttle or conveyor for conveying the empty trays into the discharge portion.

In one embodiment of the invention, the output portion has a rotatable table and a lift. These components allow the operator to position the components stored in the trays in the most ergonomically efficient position. The system further has a controller for controlling the operation of the conveyor and the lift, with the system shuttling empty trays and stacking them properly in the discharge position.

The above and other features of the invention will become apparent in the reading of the detailed description of the preferred embodiments, which makes reference to the following sets of drawings.

DETAILED DESCRIPTION OF THE PREFERRED EMBODIMENTS

Figure 1:
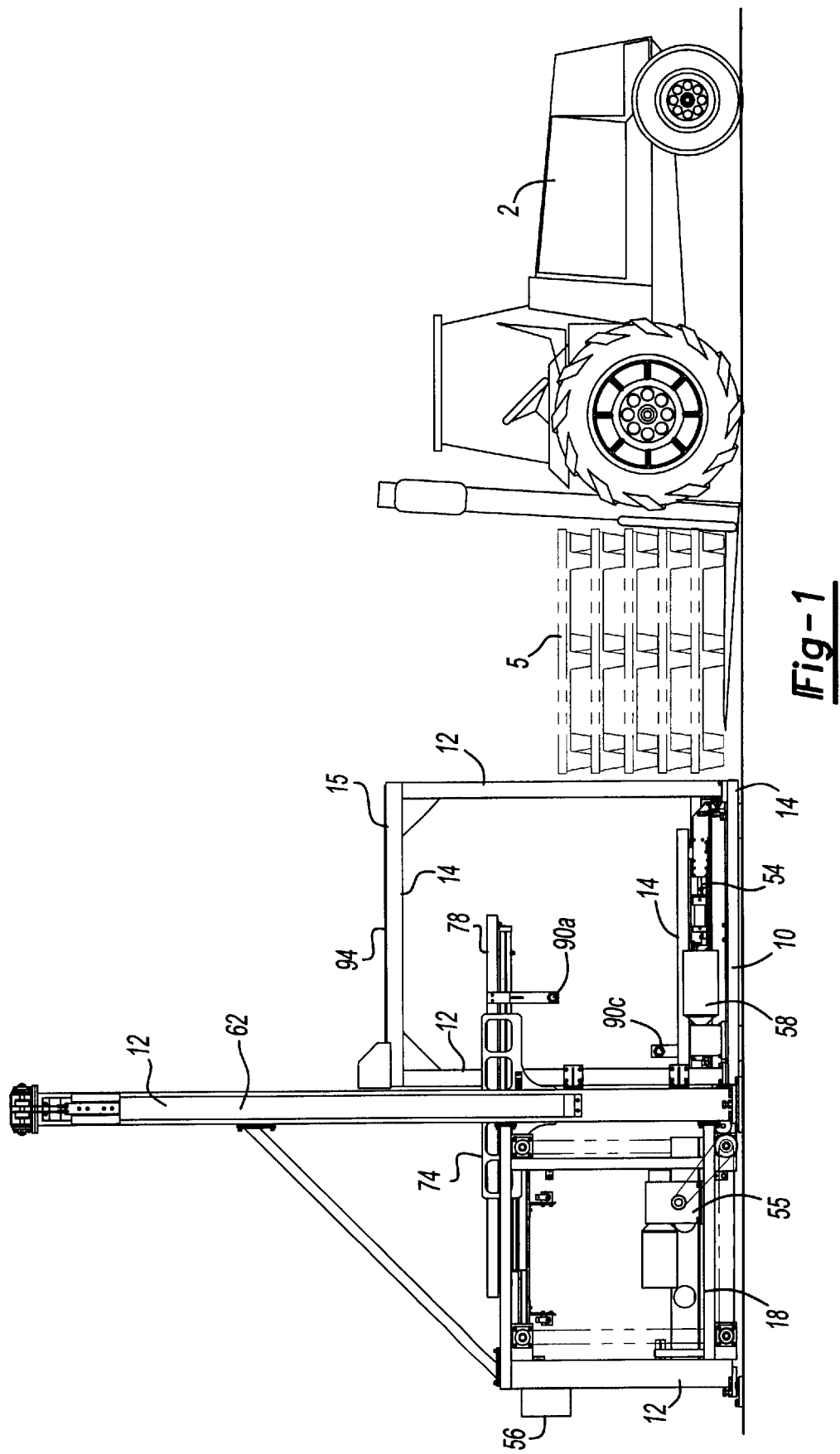
FIG. 1 is a right side view of a container storage and delivery system in accordance with one embodiment of the present invention.

Referring now specifically to the drawings, a container storage and delivery structure and system in accordance with one embodiment of the present invention is indicated generally in FIG. 1. The system has a base portion 10 having an input portion 14, output portion 18 and conveyor 54. The shuttle 74 has a support member 62 and a shuttle lift 58 for transporting empty stackable tray containers to a discharge portion 94. The stack of trays 5 is placed into the input portion 14 on the conveyor 54 by a lift truck 2. The structure is constructed of pairs of vertical and horizontal square tubing members 12, 13 that function as the support member 62. The discharge portion 94 is constructed of four parallel square tubing members 12 and at least one pair of horizontal square tubing members 13 supporting a platform 15.

Figure 2:
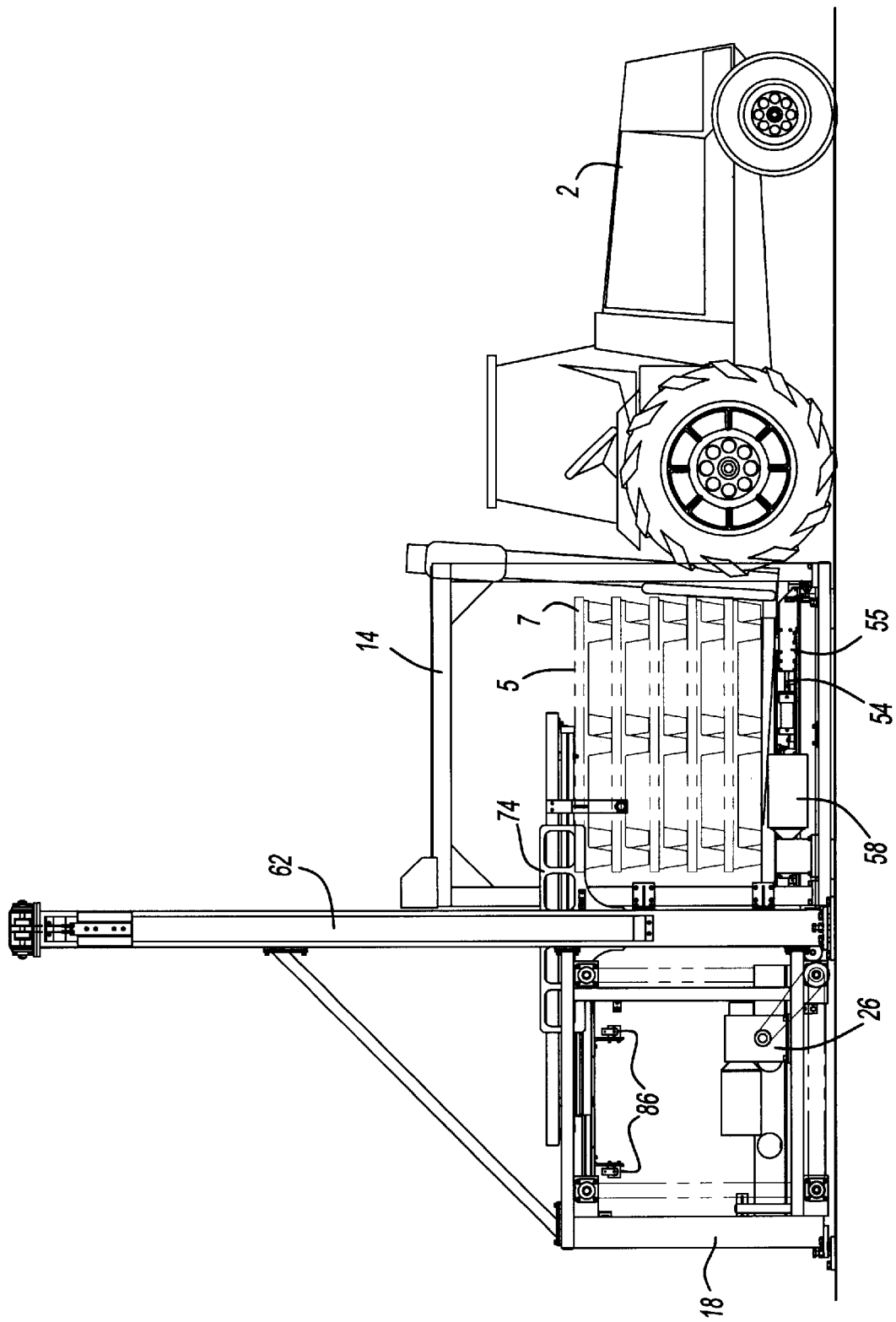
FIGS. 2–7 are right side views of the system of FIG. 1 illustrating various stages in its mode of operation.
Figure 3:
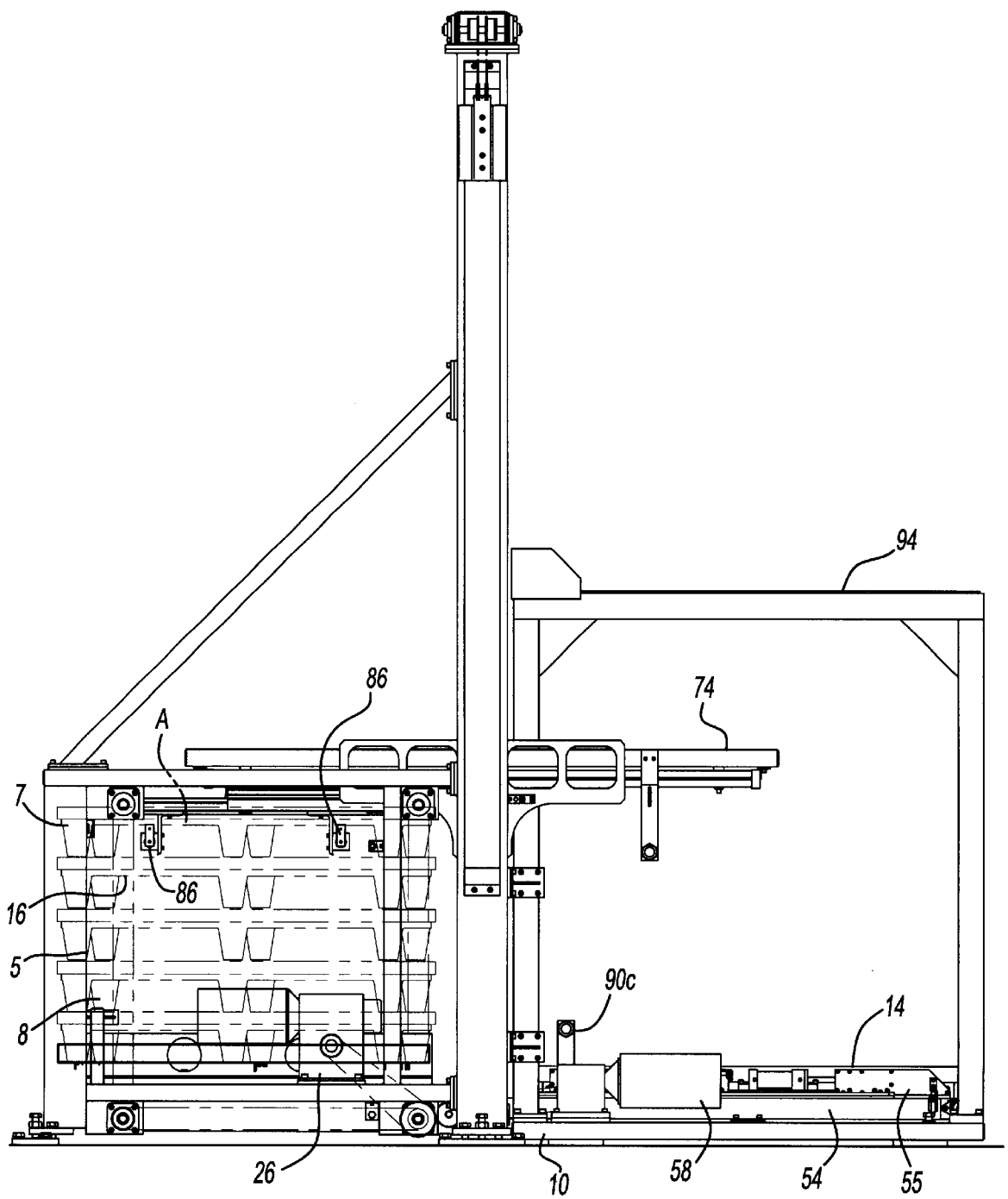

Shown in FIG. 2 is the stack of trays 5 being placed on the conveyor 54. Conveyor 54, which is driven by a conveyor drive 55, functions to transport the stack of trays 5 from the input portion to the output portion 18. The conveyor 54 can be a standard shuttle type, chain driven or roller type. The shuttle 74 is shown in a lowered position, ready to transport an empty tray 7 from the stack to the discharge portion 94. FIG. 3 shows the stack of trays 5 after they have been transported to the output portion 18 by conveyor 54. Further shown is the shuttle lift 58, which is used to raise the shuttle 74 from its lower position to its fully raised position. Also shown in the output portion 18 is a table lift 26 for automatically lifting the trays 5 to a number of predetermined positions. The shuttle 74 has a plurality of grippers 86 for lifting an empty tray 7 and placing it in the discharge portion 94. The grippers 86 have actuatable pins which engage either holes in the empty trays 7 or under engaging portions 16 of the trays 7.

Figure 4:
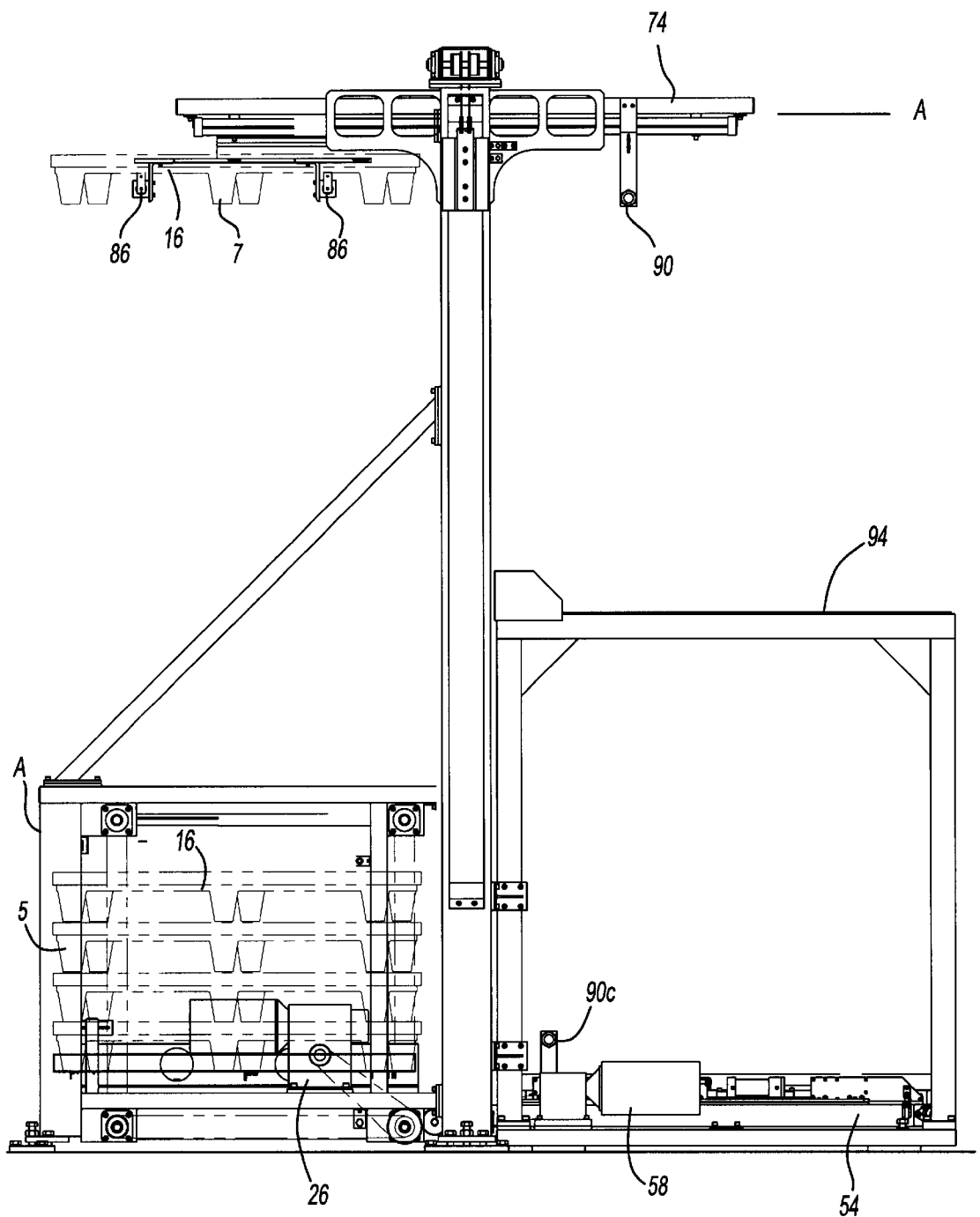

FIG. 4 shows the shuttle member 74 lifting an empty tray 7 to a raised position. The table lift 26 raises the stack trays 5 so the top layer is at a proper predetermined level A. This allows proper access to the components stored in the trays. Shown on shuttle 74 is a sensor 90a which allows the shuttle to determine its position with respect to the trays.

Figure 5:
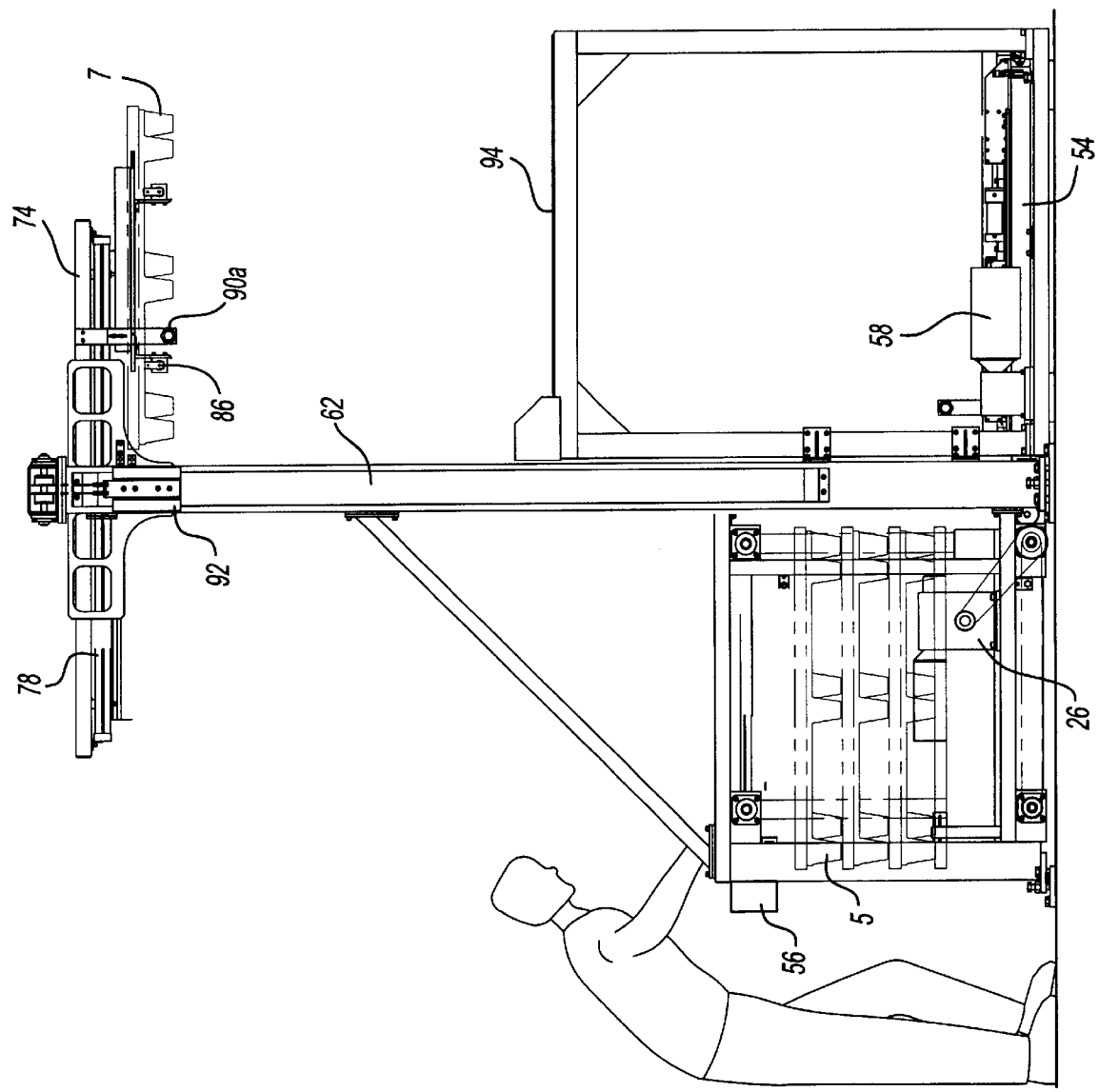
Figure 6:
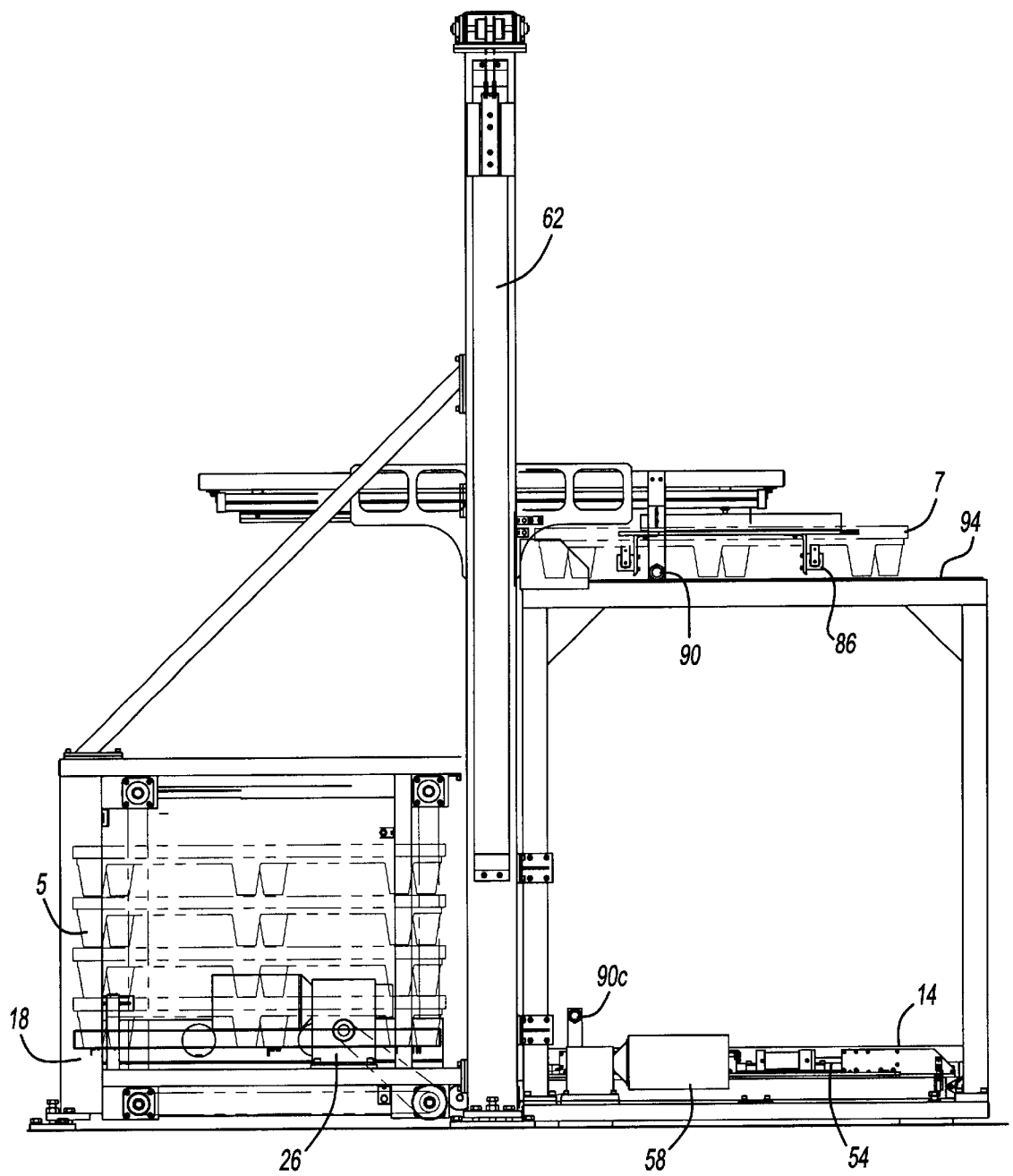
Figure 7:
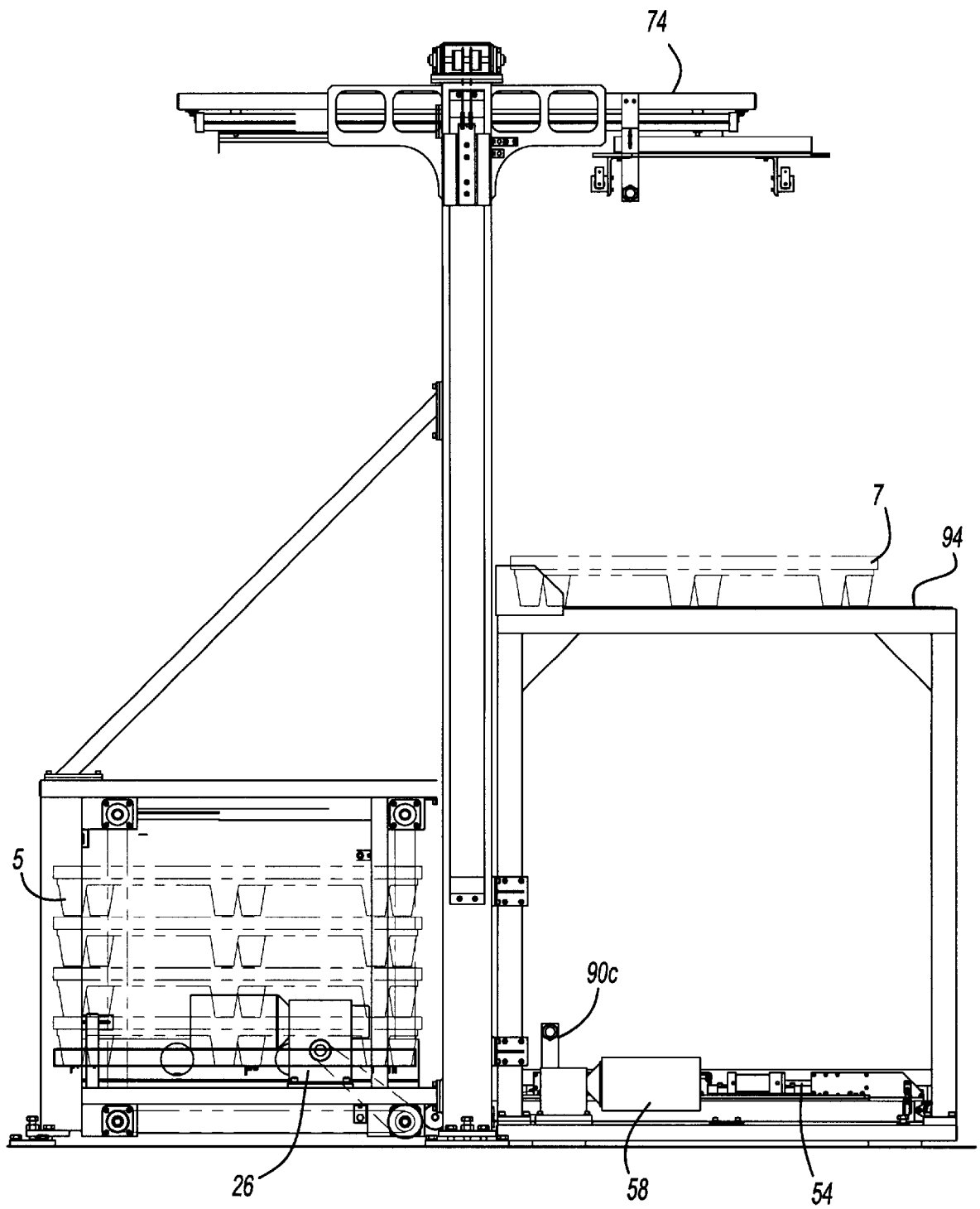

FIG. 5 shows the empty tray 7 being conveyed by the shuttle conveyor 78 over the discharge portion 94. Found on the shuttle member 74 is a safety lock 92, which prevents the accidental lowering of the shuttle member 74 in the event of equipment or power failure. Shown in FIG. 6 is the shuttle 74 being lowered to a point where it is possible to safely release the empty tray 7 by actuating the grippers 86 and allow the empty tray 7 to fall. Sensor 90a is used to determine when the shuttle 74 is in a proper position. As can be seen in FIG. 7, when the empty tray 7 has been dropped, the shuttle 74 is again raised to its uppermost position and the shuttle conveyor 78 is now allowed to move the grippers 86 back over the stack of trays 5. Upon instruction by the operator, the shuttle will again lower to pick up an empty tray and deposit it on top of the stackable empty tray 7 which has been placed in the discharge position 94.

Figure 8:
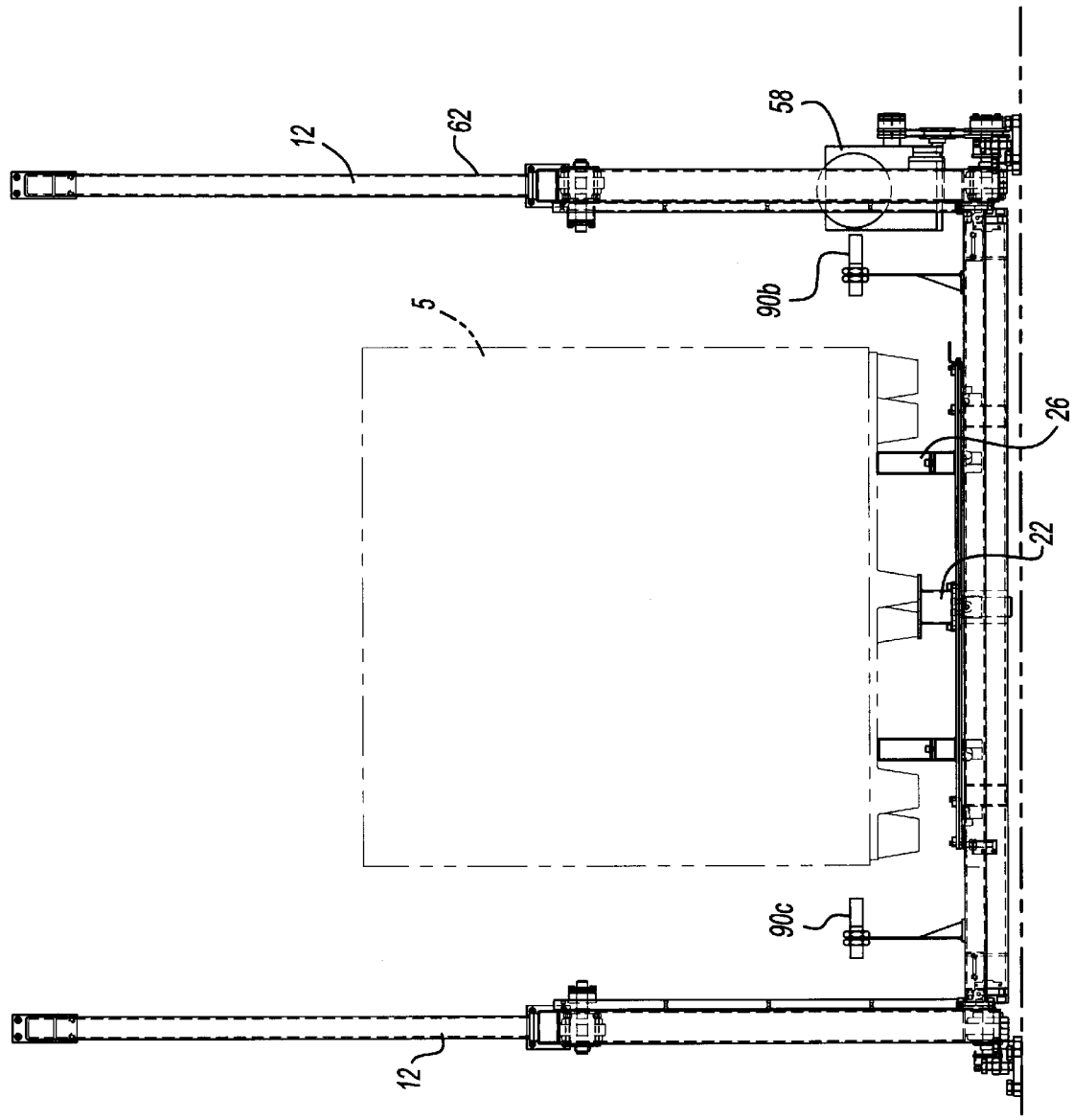
FIG. 8 is a front view of the system of FIG. 1.
Figure 9:
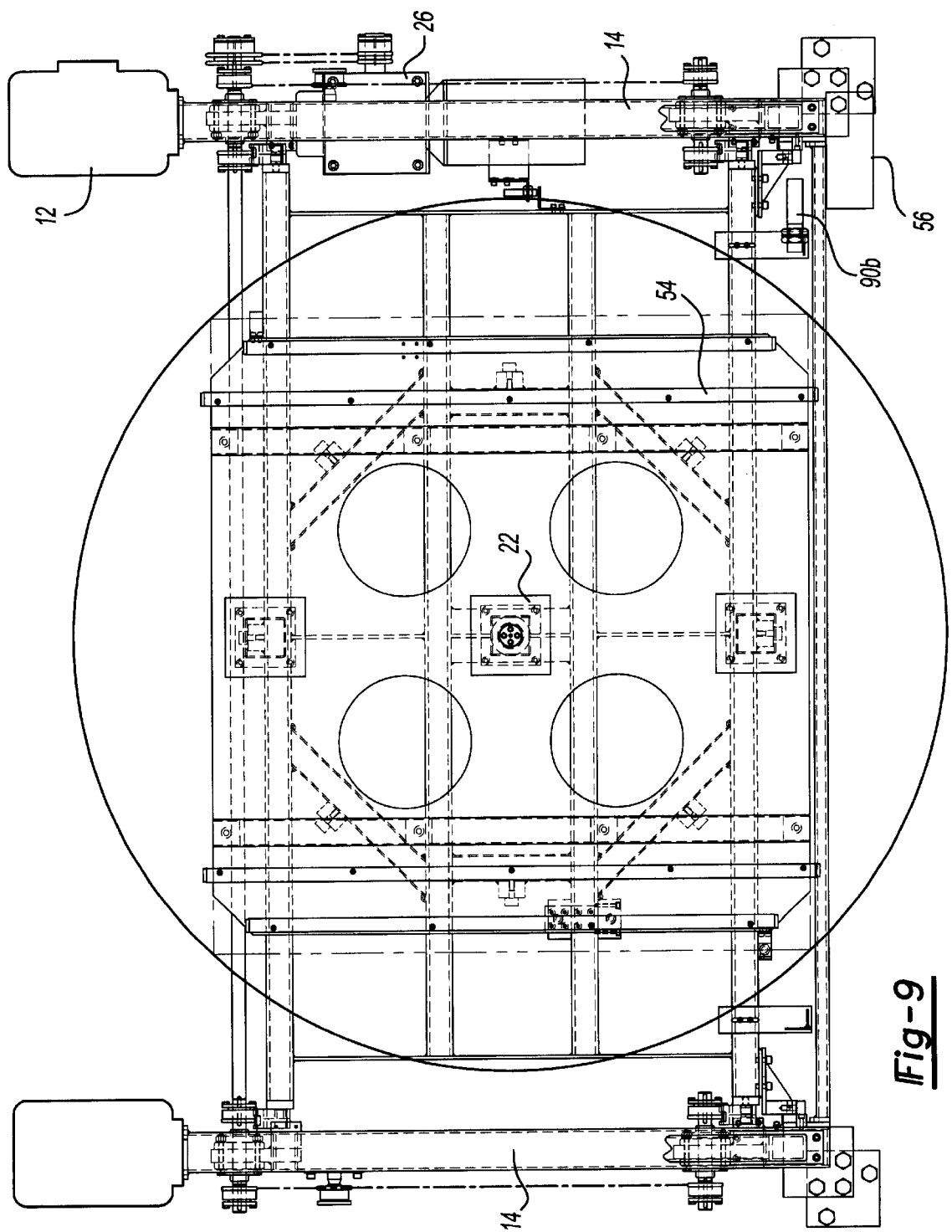
FIG. 9 is a top view of the output portion of the system.

FIG. 8 shows a front view of the container storage system holding a stack of trays 5 in the output portion 18 of the base 10. Shown is a rotatable table 22 and a table lift 26 for raising the stack of trays 5 once an empty tray has been removed from the top and placed into the discharge portion 94. FIG. 9 is the top view of the output portion of the current embodiment. Shown is the rotating table 22 and the conveyor 54. Also shown is the table lift 26 in the form of a screw drive lift. It should be noted, however, that this lift can be a scissor lift, a chain lift, a pneumatic lift or a hydraulic lift. The table lift 26 is controlled by a controller 100 found in the control panel 56 which increases the height of the trays 5 every time the top tray has been removed and placed into the discharge portion 94. The desired height is readily changeable by the operator. Additionally shown is a supplemental sensor 90b which is used by the system to determine when all of the stackable trays have been removed from the output portion and to sense when a full stack of trays 5 has been transferred to the output portion.

Figure 10:
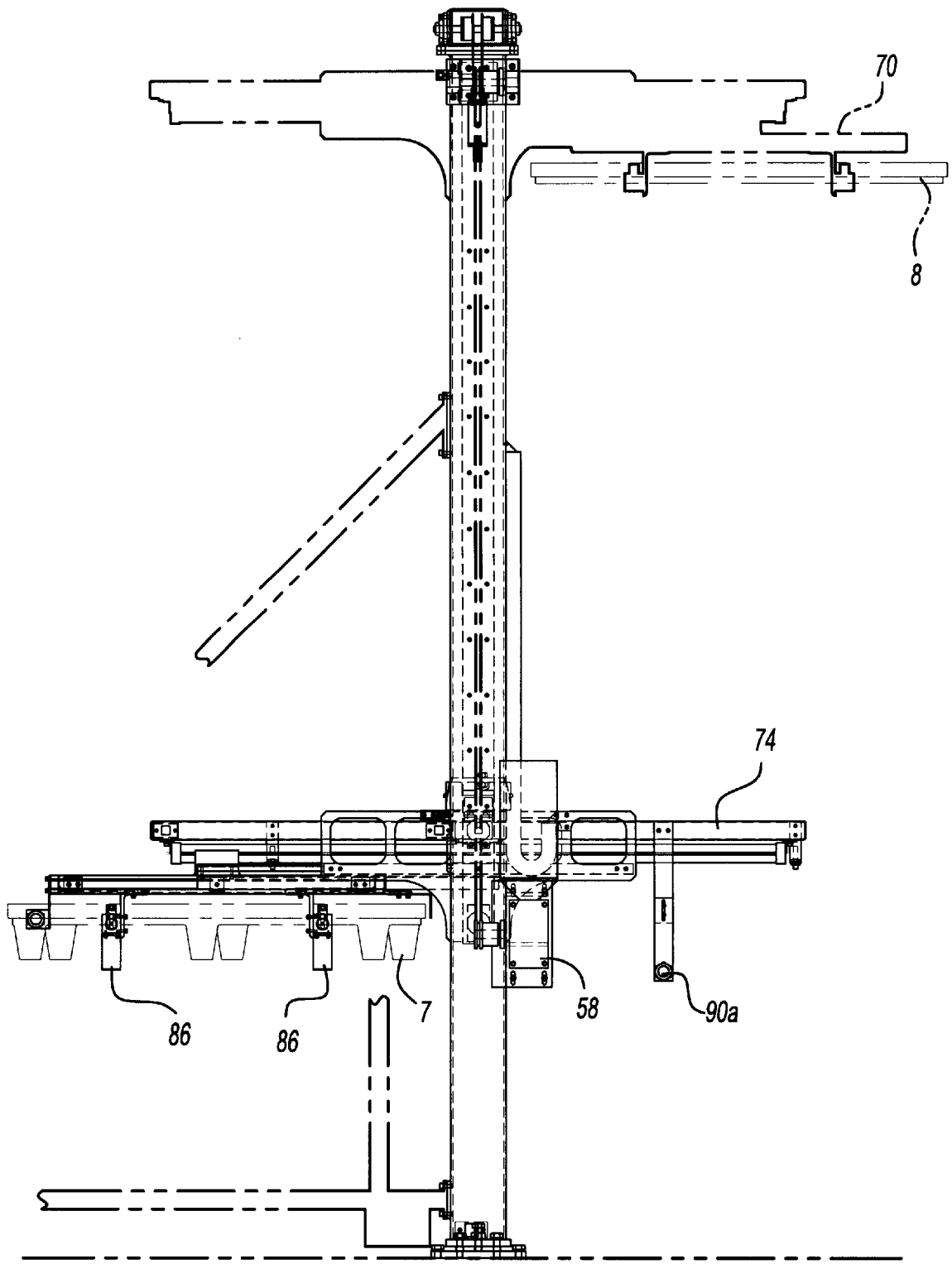
FIG. 10 is a sectional view of the lift mechanism of the system.

FIG. 10 shows an alternate embodiment. The stack of trays 5 often has a cover 8 for protecting the top layer of components from the elements. This embodiment shows an alternate storage location 70 for holding the cover 8 while the empty trays 7 are being removed from the stack of trays 5. When the last of the empty trays 7 is placed in the discharge portion 94, the shuttle will remove the cover 8 from its storage location 70 and place it on top of the stack of trays 5.

Figure 11:
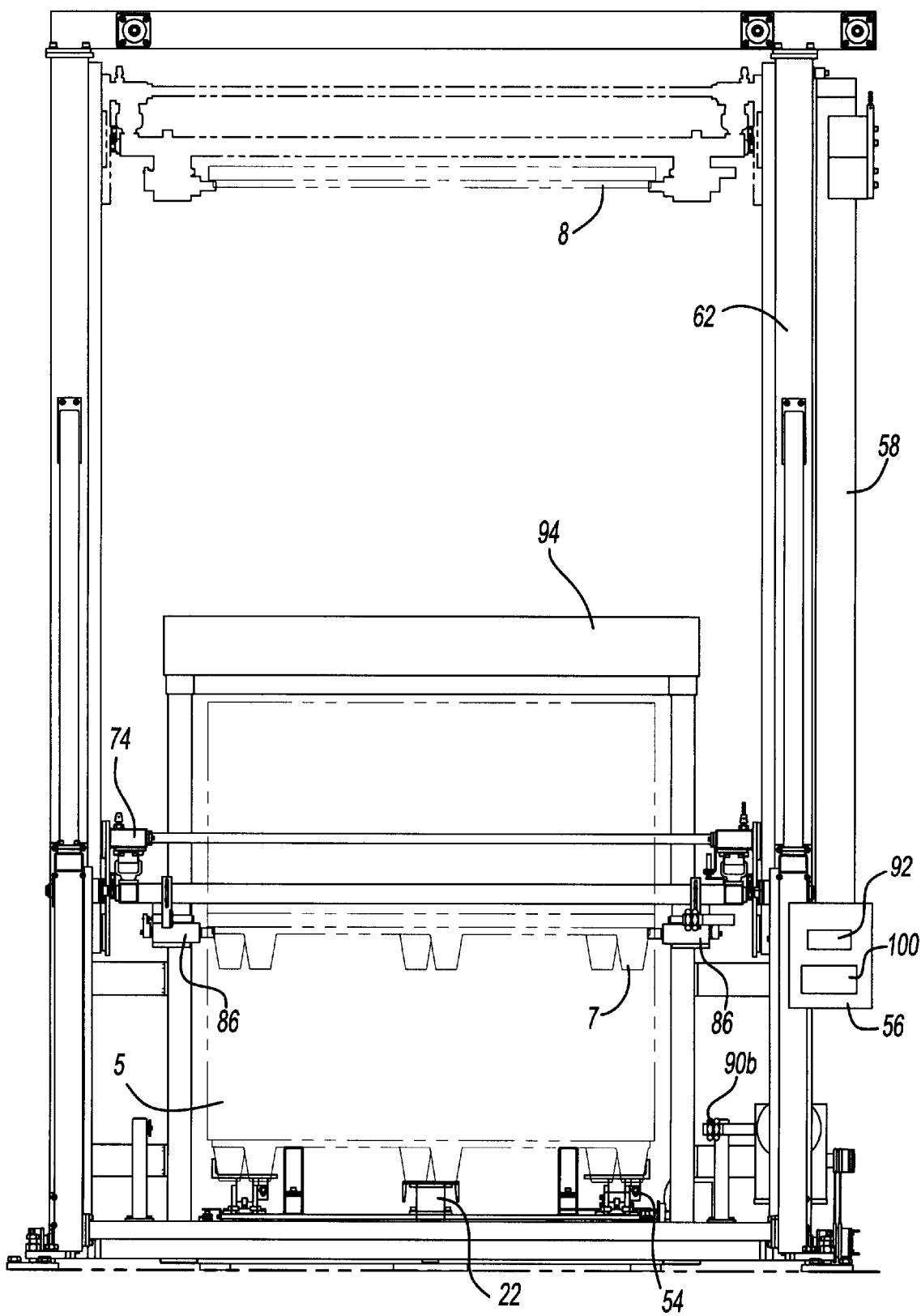
FIG. 11 is a rear view of the system.

FIG. 11 shows a front view of the alternate embodiment having the storage location 70 for storing the top cover 8. It should be noted that the upper member for storing the cover 8 does not interfere with the normal functioning of the shuttle 74.

Figure 12:
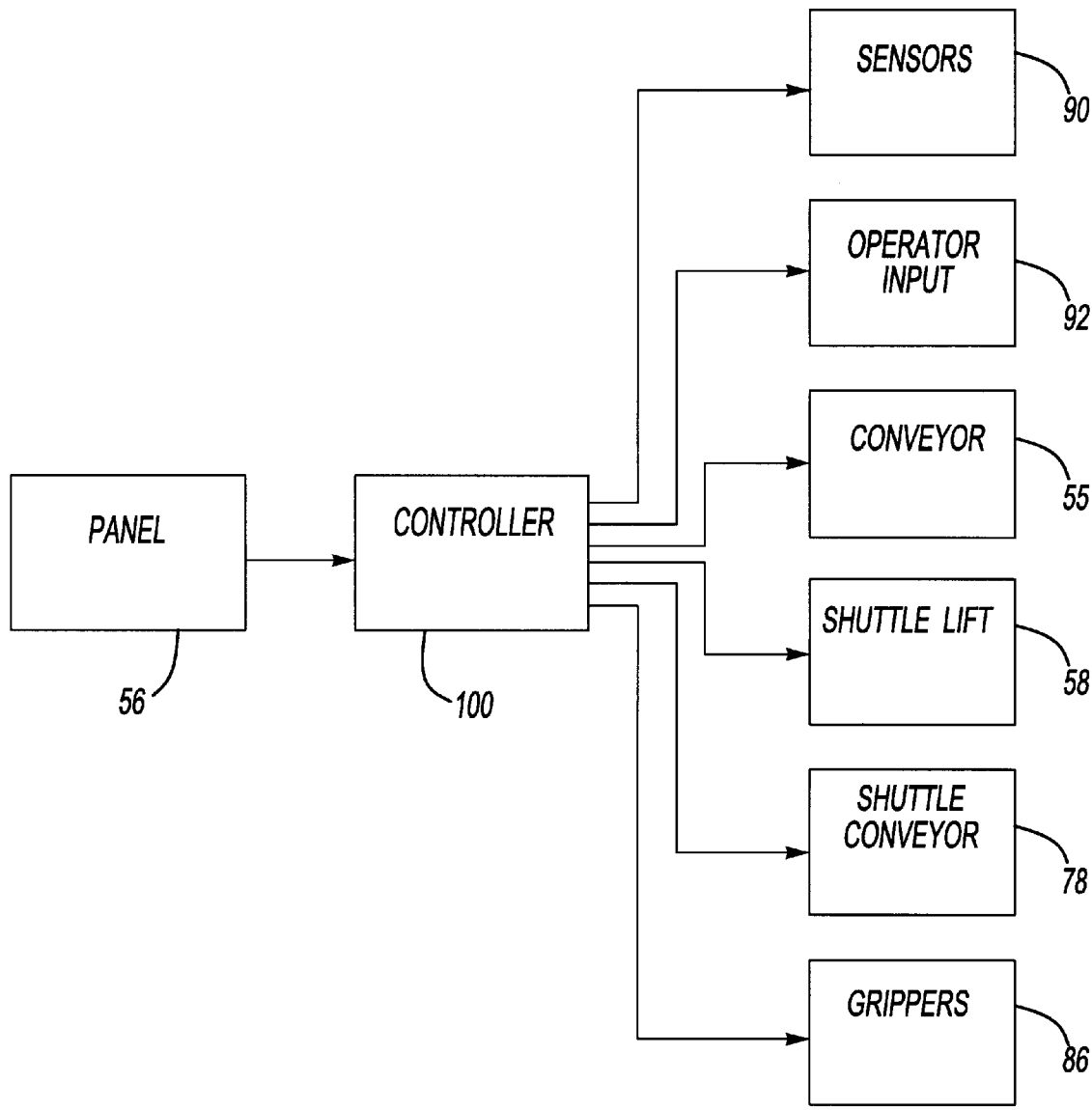
FIG. 12 is schematic diagram of the system controller.

The system has a controller 100 stored in control panel 56. As diagrammatically shown in FIG. 12, the controller 100 controls the conveyor drive 55, the shuttle lift 58, the shuttle conveyor 78 and the grippers 86. Inputs to the controller 100 come from a plurality of sensors 90a–c throughout the system as well as an operator input 92 from control panel 56. In operation, the controller receives input from sensor 90c located in the input portion 14 when a stack of trays has been inserted. If the controller 100 determines there are no empty trays 7 in the output portion 18 or the discharge portion 94, the controller 100 directs the conveyor 54 to transport the stack of trays 5 to the output portion. The stack tray 5 is then placed on the rotatable table 22 in the output portion 18 and the conveyor 54 is returned to the input portion 14.

A signal is then provided to the table lift 26 to raise the height of the stack tray 5 to a pre-determined level A. After the operator has removed the components in the tray, a push button 92 is activated which brings the shuttle 74 into position around the empty tray 7. The height of the shuttle 74 is controlled by the controller 100 in response to inputs from sensors 90a–c on the shuttle. The grippers 86 then engage the sides of the empty trays 7.

The shuttle 74 is then raised by the controller 100 to a pre-determined height. Upon reaching this height, the shuttle conveyor 78 transports the empty tray 7 over the discharge portion 94. The shuttle 74 is then lowered by the controller 100 an amount based on input from the shuttle sensor 90a. The sensor 90a determines the height of the stack of trays 5 in the discharge portion 94. Upon reaching the proper height, the controller provides a signal to the grippers 86 to release the tray 7, which drops onto the discharge region 94.

After placing the empty tray 7 in the discharge region 94, the shuttle 74 is again raised to a pre-determined height and the shuttle conveyor 78 is moved over the output portion 18. Upon receiving instruction from the operator, the shuttle 78 will drop and retrieve the next available empty tray 7.

Many changes and modifications in the above described embodiment of the invention can, of course, can be carried out without departing from the scope thereof. Accordingly, that scope is intended to be limited only by the scope of the appended claims.

I claim:

1. A method of presenting components stored in a stack of stackable trays having covers and handling the empty trays, said method comprising the steps of:

providing an apparatus having a base member, an input portion, a discharge portion disposed over said input portion adapted to accept empty trays, an output portion disposed adjacent said input portion, a first storage location adapted to store a stackable tray cover, a shuttle having grippers and a controller connected to the shuttle and grippers;

moving a stack of stackable trays into the input portion;

transferring the stack of stackable trays from the input portion to the output portion;

storing the cover of a top tray in the first storage location;

removing components from said top tray so as to leave the top tray empty;

moving the shuttle to a first position adjacent said top tray;

actuating the grippers so as to engage the empty tray to couple the empty tray to the shuttle;

lifting the shuttle to a second position;

transferring the empty tray to a position over the discharge portion with the shuttle;

lowering the shuttle to a third position; and actuating said grippers to release said empty tray and place the empty tray in said discharge portion.

2. The method of claim 1 wherein providing an apparatus includes providing a conveyor disposed between said input portion and said output portion; and wherein the step of moving a stack of trays includes actuating said conveyor to carry said stackable trays from said input portion to said output portion.

3. The method of claim 1 wherein providing an apparatus includes providing a rotatable table disposed in said output portion.

4. The method of claim 1 wherein providing an apparatus includes providing a stackable tray lift in said output portion.

5. The method of claim 1 wherein providing an apparatus includes providing a shuttle having a shuttle lift adapted to move said shuttle from said first to said second position.

6. The method of claim 1 wherein providing an apparatus includes providing a shuttle having a safety lock adapted to prevent movement of the shuttle upon occurrence of an event; and further includes the step of actuating the safety lock upon occurrence of the event.

7. The method of claim 1 wherein providing an apparatus includes providing a sensor coupled to said controller capable of providing a first signal indicative of the position of said shuttle; and further includes the step of adjusting the position of said shuttle in response to said first signal.

8. The method of claim 1 wherein providing an apparatus further includes providing a shuttle having a shuttle conveyor adapted to move said empty trays from said second position to said discharge portion; and further includes the step of actuating said shuttle conveyor to move the empty tray from the second position to the position over said discharge portion.

* * * * *